United States Patent [19]
Woolley et al.

[11] Patent Number: 5,829,778
[45] Date of Patent: Nov. 3, 1998

[54] AIR BAG RESTRAINT SYSTEM

[75] Inventors: Janice L. Woolley, Goodrich; Robert Edward Bowser, Brighton, both of Mich.

[73] Assignee: General Motors Corporation, Detroit, Mich.

[21] Appl. No.: 903,736

[22] Filed: Jul. 31, 1997

[51] Int. Cl.6 .................................................. B60R 21/20
[52] U.S. Cl. ...................................... 280/728.3; 280/732
[58] Field of Search ................................ 280/728.3, 732, 280/728.2, 731, 728.1

[56] References Cited

U.S. PATENT DOCUMENTS

| | | | |
|---|---|---|---|
| 3,708,179 | 1/1973 | Hulten | 280/728.3 |
| 4,327,937 | 5/1982 | Scholz et al. | 280/732 |
| 4,893,833 | 1/1990 | Di Salvo et al. | 280/732 |
| 5,320,381 | 6/1994 | Barnes et al. | 280/728.3 |
| 5,333,901 | 8/1994 | Barnes | 280/732 |
| 5,335,936 | 8/1994 | Faigle et al. | 280/728.2 |
| 5,437,469 | 8/1995 | Monden | 280/728.3 |
| 5,687,989 | 11/1997 | Maesing et al. | 280/728.2 |

FOREIGN PATENT DOCUMENTS 92 14632  9/1992  WIPO ................................ 280/728.3

*Primary Examiner*—Christopher P. Ellis
*Attorney, Agent, or Firm*—Kathryn A. Marra

[57] ABSTRACT

An air bag restraint system includes an instrument panel having an upper pad having a rearward edge and a lower pad having an upper edge. The upper edge of the lower pad is releasably connected to the rearward edge of the upper pad. The air bag restraint system also includes an air bag module mounted forward of the lower pad and including an air bag deployable in a generally rearward direction. Upon air bag deployment, the force of the deploying air bag releases the upper edge of the lower pad from the rearward edge of the upper pad such that the lower pad bends generally rearwardly and downwardly for permitting deployment of the air bag rearward of the lower pad.

12 Claims, 4 Drawing Sheets

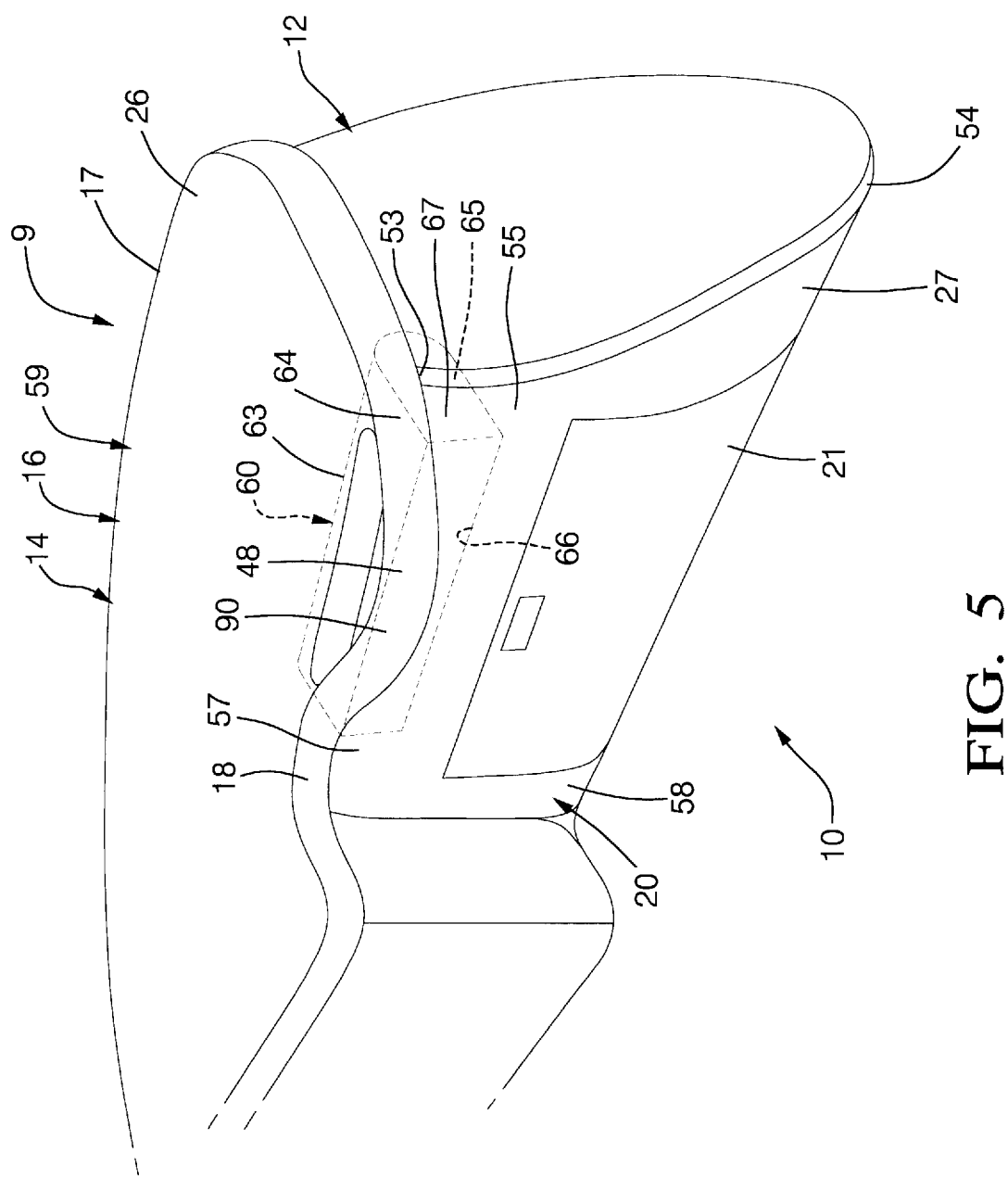

AIR BAG RESTRAINT SYSTEM

TECHNICAL FIELD

This invention relates to an air bag restraint system including an instrument panel having a hidden air bag deployment path through which a rearwardly directed air bag may deploy for protection of a vehicle occupant.

BACKGROUND OF THE INVENTION

It is well known in motor vehicles to provide an air bag module including an inflatable air bag which deploys into the vehicle interior for protection of one or more vehicle occupants. Such air bag modules are typically mounted on the steering wheel forward of a driver seating position and beneath an instrument panel forward of a passenger seating position. The instrument panel typically includes an upper surface or topper pad and a rearward facing surface or lower pad which may be separate or joined together.

It is also known to provide the passenger side air bag module as a mid-mount design when desirable based on the vehicle size and interior configuration. The mid-mounted air bag module includes an air bag deployable in a generally rearward direction towards the vehicle passenger. It is known to mount the air bag module beneath the rearward facing lower pad and to provide an air bag deployment opening carved out of the padded surface of the lower pad of the instrument panel through which the air bag may deploy. The deployment opening in the instrument panel cover is closed by an air bag cover door which opens in response to air bag deployment to permit the air bag to deploy into the passenger compartment in a generally rearward direction.

The air bag cover door conceals the air bag module from view and is supported on the instrument panel in a manner which will protect the air bag module and yet open rapidly in the event of air bag deployment. The prior art has provided many such air bag door constructions for closing the deployment opening in the instrument panel cover. For example, the deployment opening is generally provided with a separate cover door having color and texture for generally matching that of the instrument panel front of dash. However, the separate cover door is typically not made of the same material as the instrument panel and some variations in color and texture will occur. Furthermore, the outline of the deployment door opening and the cover is visible on the instrument panel directly in front of the passenger. In addition, weakened seams or tear lines are typically provided which break open upon air bag deployment. It has also been suggested to provide underlying scoring or cuts in the instrument panel such that the deployment opening is only partially formed until the inflating air bag forces open the deployment door to provide the opening. However, this arrangement requires complex secondary operations during the manufacturing process and the underlying cut lines may also be visible from the vehicle interior by a passenger.

It is also known in the prior art to provide an upper pad of the instrument panel which lifts open during air bag deployment as shown in U.S. Pat. No. 5,333,901 issued on Aug. 2, 1994 and assigned to General Motors Corporation. However, this arrangement cannot be utilized for mid-mount modules having a rearward deploying air bag.

SUMMARY OF THE INVENTION

The present invention provides alternative and advantages over the prior art by providing a deployment path for an air bag restraint system having an air bag which deploys in a generally rearward direction without requiring a deployment opening carved into the instrument panel. In addition, a separately formed air bag cover door is no longer required resulting in ease of assembly and manufacturability over the prior art. Furthermore, the present invention eliminates the need for both an air bag deployment opening and an air bag cover door and provides an aesthetically pleasing and smooth instrument panel surface facing the vehicle passenger without any visible cut lines.

These advantages are accomplished by providing an air bag restraint system for use in a vehicle. The air bag restraint system includes an instrument panel having an upper pad having a rearward edge and a lower pad having an upper edge. The upper edge of the lower pad is releasably connected to the rearward edge of the upper pad. The air bag restraint system also includes an air bag module mounted forward of the lower pad and including an air bag deployable in a generally rearward direction. Upon air bag deployment, the force of the deploying air bag releases the upper edge of the lower pad from the rearward edge of the upper pad such that the lower pad bends generally rearwardly and downwardly for permitting deployment of the air bag rearward of the lower pad. Preferably, the upper pad is generally horizontally oriented and the lower pad is generally vertically oriented.

Preferably, the rearward edge of the upper pad protrudes rearward past the upper edge of the lower pad such that the rearward edge of the upper pad shingles over and conceals the upper edge of the lower pad prior to air bag deployment. The rearward edge of the upper pad may also project downwardly to releasably capture the upper edge of the lower pad prior to air bag deployment, such as by providing a lip portion on the rearward edge. In addition, the rearward edge may include a rearwardly projecting grab handle which can advantageously serve the multiple functions of shingling over, releasably capturing, and concealing the upper edge of the lower pad in addition to providing assistance to occupants during ingress and egress from the vehicle.

In accordance with other preferred aspects of the invention, the lower pad includes a generally transversely extending hinge portion spaced below the upper edge of the upper pad. Upon air bag deployment, the lower pad pivots rearward and downward about the hinge portion to provide an air bag deployment opening through which the air bag deploys. Preferably, the hinge portion is anchored to the vehicle for remaining generally stationary during air bag deployment. Also, the lower pad may include a bottom edge, an upper portion positioned between the hinge portion and the upper edge, and a lower portion positioned between the hinge portion and the bottom edge. Advantageously, the upper portion of the lower pad pivots generally rearwardly and downwardly about the hinge portion to provide the air bag deployment opening. While the lower portion remains generally stationary. Furthermore, the lower pad may include a generally vertically oriented substrate portion having a generally forwardly extending leg portion anchored to the vehicle and providing the hinge portion about which the lower pad bends open.

BRIEF DESCRIPTION OF THE DRAWINGS

FIG. 5 is a perspective view of the vehicle interior showing an alternate embodiment of the invention in which the upper pad includes a grab handle.

DESCRIPTION OF THE PREFERRED EMBODIMENT

Figure 1:
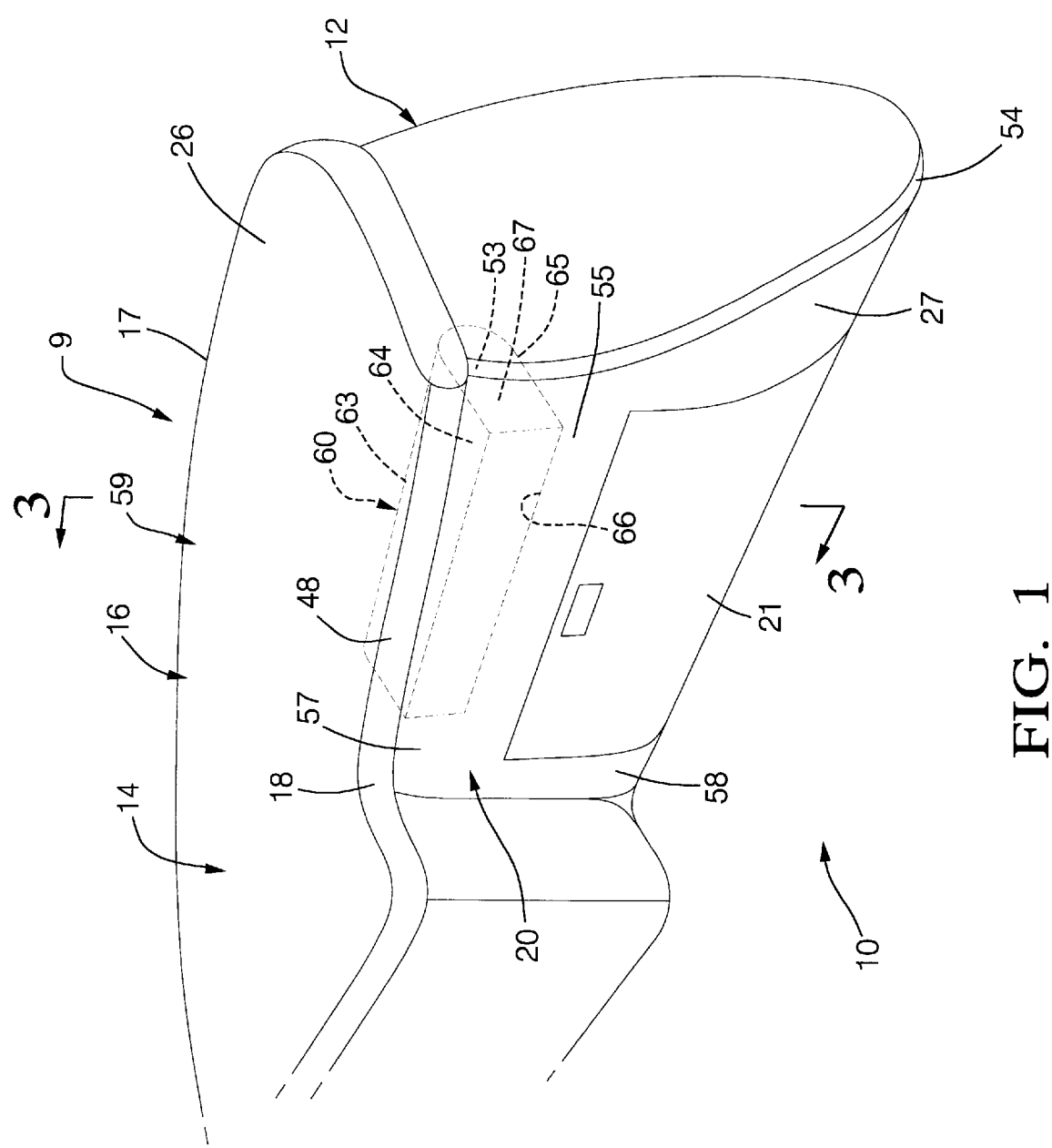
FIG. 1 is a perspective view of a vehicle interior including an air bag restraint system including an instrument panel having an upper pad, a lower pad, and an air bag module mounted forward of the lower pad, and showing the air bag restraint system in an undeployed condition.

Referring to FIG. 1, a vehicle 9 includes a vehicle interior 10 including an instrument panel 12 extending transversely across the vehicle interior 10 between the sides (not shown) of the vehicle 9. The left side of the instrument panel 12 includes an instrument cluster and steering wheel (not shown) located in front of a vehicle driver. The right side of the vehicle interior 10 is positioned forwardly of a vehicle passenger (not shown). It will be appreciated that a passenger could also be seated in a center seating position.

The structure of the instrument panel 12 includes an instrument panel outer cover assembly, generally designated as 14. The instrument panel cover assembly 14 conceals the components attached to an underlying cross car beam structure, such as HVAC ducts (not shown) and an air bag module 60. The instrument panel cover assembly 14 includes a generally horizontally oriented upper pad 16 extending transversely across the entire width of the vehicle interior 10. The instrument panel cover assembly 14 further includes a generally vertically oriented lower pad 20 which extends generally transversely across the entire width of the vehicle interior 10. The upper pad 16 is preferably formed as a single continuous structure, which provides a generally smooth and aesthetically pleasing surface which may be slightly curved for a pleasing design. While the upper pad 16 is generally horizontally oriented, it will be appreciated that this also includes the upper pad 16 being sloped downwardly or curved including transitional portions that may be generally vertical. The lower pad 20 is also preferably formed as a single continuous integral structure, which provides a generally smooth and aesthetically pleasing rearwardly facing surface presented to the vehicle occupants. The generally vertical lower pad 20 may also be provided with various curvatures including horizontal portions, and may also include openings for certain components, such as the radio, HVAC ducts, and for a glove box door 21.

Figure 3:
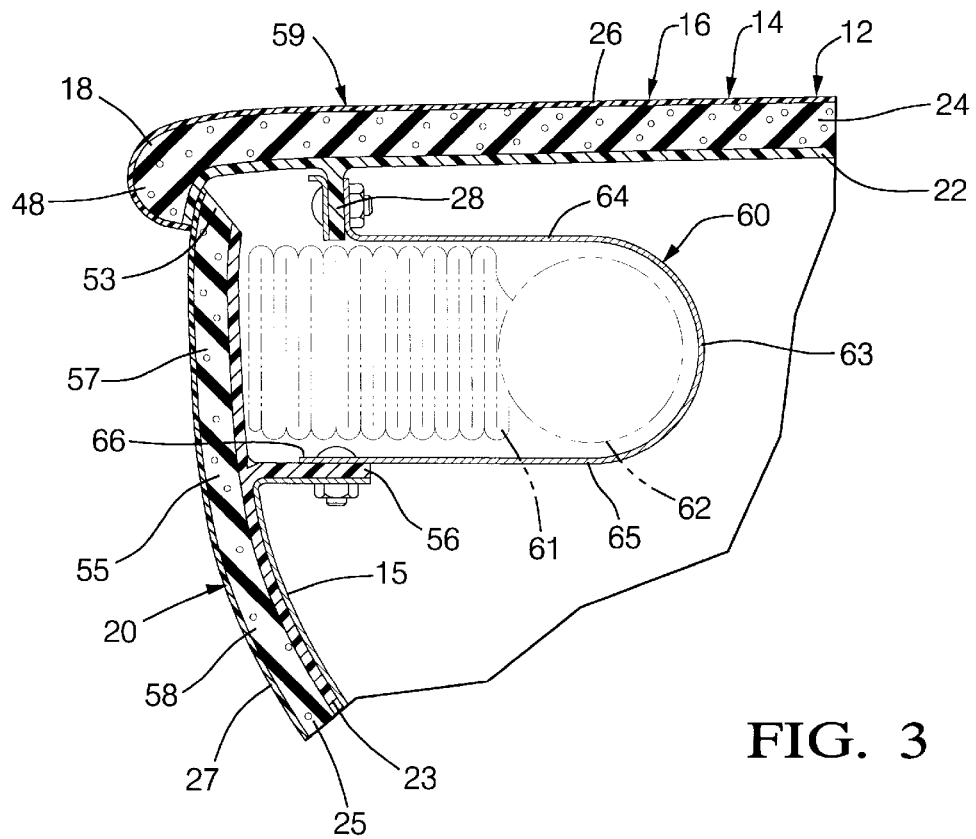
FIG. 3 is a sectional view taken along line 3—3 of FIG. 1 and showing the air bag restraint system in the undeployed condition.
Figure 4:
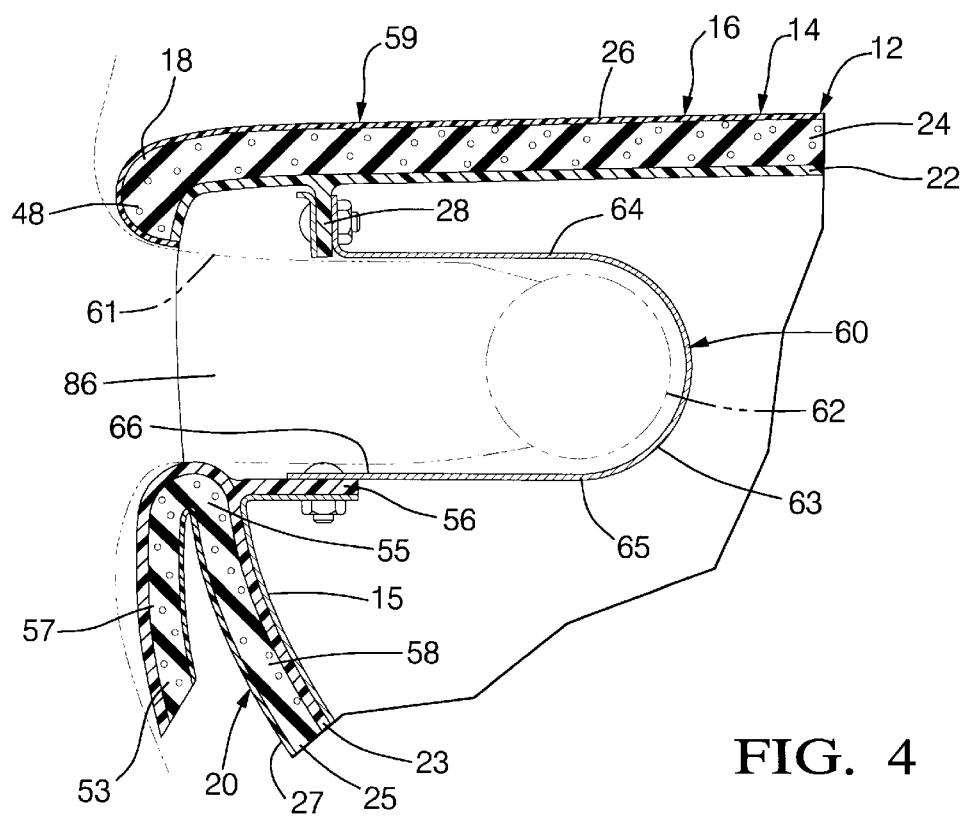
FIG. 4 is a sectional view taken along line 4—4 of FIG. 2 and showing the air bag restraint system in the deployed condition.

Preferably, the upper pad 16 and the lower pad 20 are each formed independent and separate from each other. However, the upper and lower pads 16, 20 each preferably have a similar structure which will now be described. As best shown in FIGS. 3 and 4, the upper and lower pads 16, 20 include upper and lower substrates 22, 23 each preferably being made of a molded plastic material. Most preferably, the upper substrate 22 has greater rigidity than the lower substrate 23 for permitting bending of the lower pad 20 during air bag deployment, as described further hereinafter. In addition, the upper and lower substrates 22, 23 are each covered by upper and lower foam layers 24, 25, respectively, overlying the substrates 22, 23 and covered by thin upper and lower outer skin layers 26, 27, respectively. Preferably, the outer skin layers 26, 27 are made of a plastic material, such as vinyl.

Referring to FIGS. 1–4, the upper pad 16 includes a forward edge 17 which intersects the vehicle 9 at the windshield (not shown). The upper pad 16 also includes a rearward edge 18 projecting rearwardly towards the occupants. The upper substrate 22 includes a downwardly projecting finger 28 which is spaced forward of the rearward edge 18 of the upper pad 16. The finger 28 is preferably integrally molded with the upper substrate 22 and provides a location for attachment of the air bag module 60 to the upper pad 16, as described further hereinafter. The lower pad 20 includes an upper edge 53 and a bottom edge 54. The upper edge 53 of the lower pad 20 intersects with the rearward edge 18 of the upper pad 16, in a manner described in more detail below.

Figure 2:
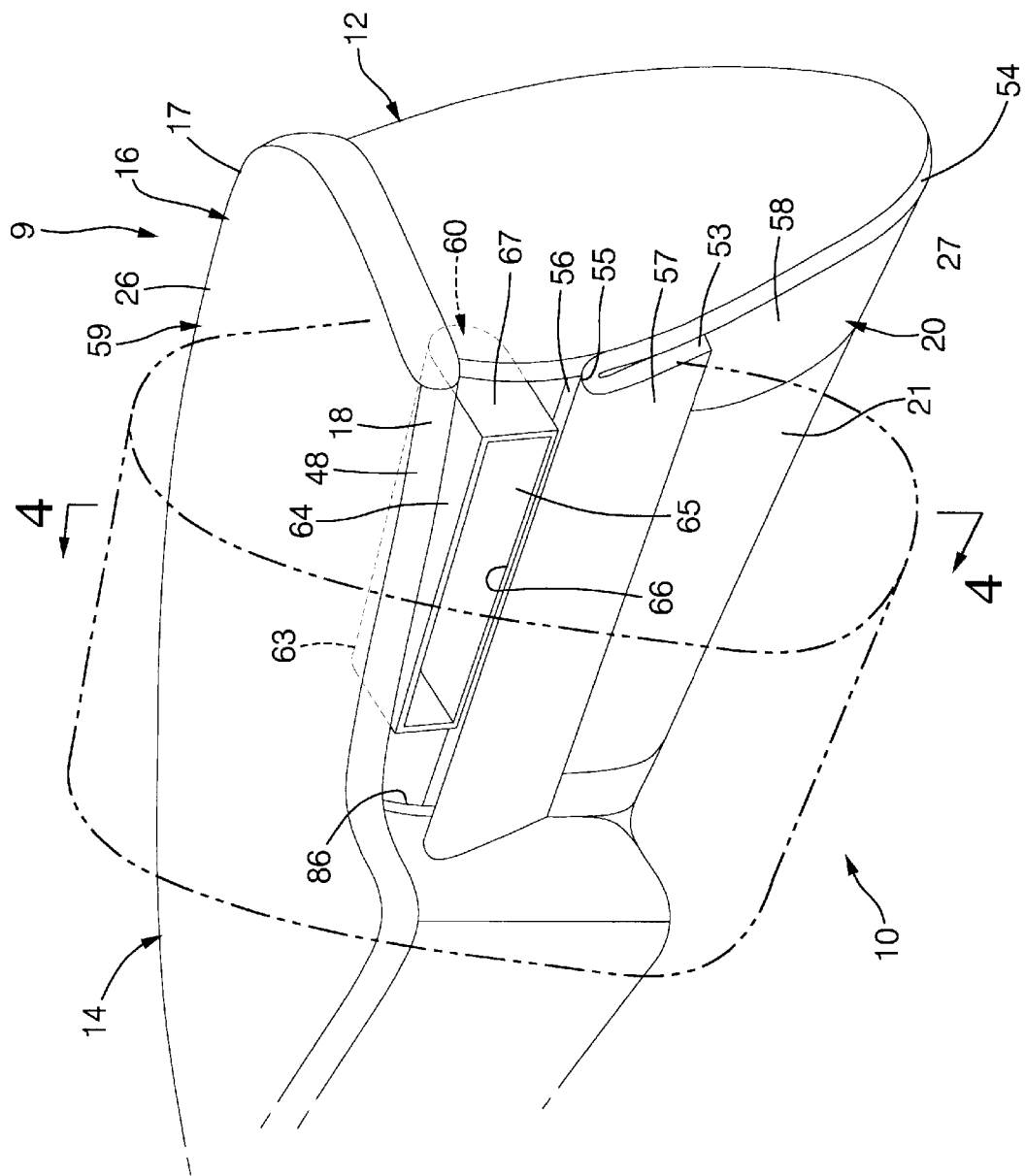
FIG. 2 is a perspective view similar to FIG. 2, but showing the air bag restraint system in the deployed condition for protecting a vehicle passenger.

The lower pad 20 includes a transversely extending intermediate hinge portion 55 spaced below the upper edge 53 and preferably spaced above the bottom edge 54. Preferably, a forwardly projecting leg portion 56 is located on the hinge portion 55 and is integrally molded with the lower substrate 23. The leg portion 56 is preferably attached to suitable rigid vehicle structure 15 underlying the instrument panel 12, such as a bracket, preferably being made of metal. The lower pad 20 bends or pivots open about the transverse hinge portion 55 when forced open by an inflating air bag 61 as shown in FIG. 4. Thus, the hinge portion 55 is preferably spaced below the upper edge 53 by a sufficient amount to provide a deployment path for the air bag 61 when opened. The lower pad 20 includes an upper portion 57 which is positioned between the upper edge 53 and the hinge portion 55 and is an integral and continuous portion of the lower pad 20. The lower pad 20 also has a lower portion 58 located between the hinge portion 55 and the bottom edge 54 and which is generally stationary during air bag deployment as enabled by anchoring of the hinge portion 55 to the vehicle by the leg portion 56. As best shown in FIGS. 1 and 2, a glove box door 21 may advantageously be located on the lower portion 58 in this arrangement. It will be appreciated that the upper portion 57 of the lower pad 20 must be sufficiently flexible to pivot open about the hinge portion 55 while remaining attached as an integral part of the entire lower pad 20. Due to the high forces of the deploying air bag 61, this can typically be accomplished by the same structure which is generally used for the entire upper and lower pads 16, 20. Alternately, the portion of the lower substrate 23 supporting the upper portion 57 of the lower pad 20 could be molded with a lesser thickness or a thinned portion could be molded into the lower substrate 23 to follow the line of the hinge portion 55. It will further be appreciated that the hinge portion 55 could alternately be located essentially at the bottom edge 54 of the lower pad 20 to provide a larger deployment path for the inflating air bag 61.

As shown in FIGS. 1–4, the air bag restraint system 59 includes the upper pad 16, the lower pad 20 and the air bag module 60. The air bag module 60 includes an inflator 62 for generating gas to inflate an air bag 61. The air bag module 60 also includes a housing 63 in which the air bag 61 and inflator 62 are stored. The housing 63 includes an upper wall 64 and a lower wall 65 closed by side walls 67. The air bag module 60 is a mid-mount type module which is oriented such that the housing 63 has a rearwardly facing housing opening 66 through which the air bag 61 deploys. Thus, it will be appreciated that the air bag 61 deploys out through the housing opening 66 in a generally rearward direction as best seen in FIGS. 2 and 4.

As best seen in FIGS. 3 and 4, the air bag module 60 is attached to the instrument panel 12 by attachment of the upper wall 64 to the downwardly projecting finger 28 and by attachment of the lower wall 65 to the rearwardly projecting leg portion 56. Advantageously, the leg portion 56 attached to the vehicle structure 15 anchors the hinge portion 55 to the vehicle 9 as well as provides an attachment location for the lower wall 65 of the housing 63. However, it will be appreciated that the housing 63 of the module 60 could be attached to any suitable underlying vehicle structure and need not be attached to the upper and lower pads 16, 20 of the instrument panel 12. It will further be appreciated that the housing 63 could be integrally formed as a part of the underlying vehicle structure in the instrument panel 12, particularly when cast or molded.

In accordance with the invention, the upper edge 53 of the lower pad 20 is releasably connected to the rearward edge 18 of the upper pad 16. For example, the rearward edge 18 of the upper pad 16 includes an enlarged lip portion 48 projecting rearwardly and downwardly from the main body of the upper pad 16. The lip portion 48 is located rearward of the upper edge 53 of the lower pad 20 when the lower pad 20 is in the normal closed condition as shown in FIGS. 1 and 3. Thus, it will be appreciated that the lip portion 48 overlaps, conceals and traps the upper edge 53 of the lower pad 20 to maintain the lower pad 20 in the upright position under normal vehicle usage. It will be appreciated that the upper edge 53 of the lower pad 20 is not anchored to the vehicle structure, but is easily captured behind the lip portion 48 by placement of the lip portion 48 over the upper edge 53 during assembly. Advantageously, no fasteners are required to accomplish this releasable connection when provided in this or a similar manner. Thus, the upper edge 53 of the lower pad 20 can be pushed open by the deploying air bag 61 to provide a deployment opening 86 in the lower pad 20, as described below.

The air bag restraint system 59 functions in the following manner. Upon air bag deployment, the air bag 61 begins inflating in a rearwardly direction as directed by the orientation of the housing 63 and the housing opening 66. The air bag 61 pushes rearwardly on the lower pad 20 such that the upper edge 53 of the lower pad 20 is released from behind the lip portion 48 and the continuing force of the deploying air bag 61 bends the upper portion 57 of the lower pad 20 downwardly and rearwardly to reveal a deployment opening 86 through which the air bag 61 can deploy into the passenger compartment as shown in FIGS. 2 and 4. Preferably, as the lower pad 20 is bent downwardly and rearwardly, the upper portion 57 of the lower pad 20 pivots about the transverse hinge portion 55 to reveal the deployment opening 86 while the lower portion 58 of the lower pad 20 is held generally in place and is anchored to the vehicle 9 at the hinge portion 55 by attachment of the leg portion 56 to the vehicle structure 15.

Advantageously, the lower pad 20 of the instrument panel 12 provides the functions of an air bag cover door without actually providing a separate air bag cover door for the elimination of visible cut lines. In addition, complex secondary manufacturing operations for cutting or slotting an opening in the instrument panel 12 for forming an air bag deployment door are eliminated, Also advantageously, the hinge portion 55 is integrated into the lower pad 20 of the instrument panel 12 such that the hinge portion 55 is easily anchored to the vehicle structure 15. Conveniently, the hinge portion 55 can also be used as a location for attachment of the air bag module 60 to the vehicle. Essentially, the air bag deployment opening 86 is entirely hidden from view and a smooth and continuous lower pad 20 may be presented to the vehicle occupants. Also advantageously, the upper and lower foam layers 24, 25 and upper and lower outer skin layers 26, 27 present a continuous and consistent outer decorative covering over the entire instrument panel 12 since the same materials may preferably be used for all of the surfaces.

It will be understood that a person skilled in the art may make modifications to the preferred embodiment shown herein within the scope and intent of the claims. Although the preferred embodiment shows the hinge portion 55 being formed by a leg portion 56 anchored to the vehicle structure 15, it will be appreciated that any suitable structure may be used for the hinge portion 55 so long as the lower pad 20 includes the transverse hinge portion 55 which is anchored and generally stationary and about which the upper portion 57 of the lower pad 20 can pivot or bend open. While the hinge portion 55 is shown as exactly transverse, it will be appreciated that the hinge portion 55 need not extend exactly transversely, but only need to extend generally transversely such that the upper portion 57 can bend open generally downward and rearward during air bag deployment. For example, the hinge portion 55 could be slightly higher at one transverse end than at another such that the inflating air bag 61 is somewhat laterally biased during inflation. It will further be appreciated that the hinge portion 55 could alternately be located at the bottom edge 54 of the lower pad 20 for the maximum deployment opening 86. It will further be appreciated that although the deployment opening 86 is shown generally on the right side of the vehicle interior 10, it will be appreciated that the deployment opening 86 could extend essentially across the entire vehicle interior 10 in a transverse direction such that occupants in the middle and left seating positions could also be protected by the same or multiple air bag modules 60.

Although the upper edge 53 of the lower pad 20 is preferably shown as releasably attached to the rearward edge 18 of the upper pad 16 by the lip portion 48, it will be appreciated that other suitable releasable attachments could be used. For example, releasable fasteners could be used in conjunction with the lip portion 48. It is most important that the rearward edge 18 extend rearward past the upper edge 53 to conceal the upper edge 53 from view. As another example, FIG. 5 shows an alternate embodiment of the invention having a description identical to that shown above with respect to FIGS. 1–4, but including a grab handle 90 on the rearward edge 18 of the upper pad 16. Features similar to those in FIGS. 1–4 are denoted with similar numerals. However, advantageously in FIG. 5, the upper pad 16 includes the rearwardly protruding grab handle 90 which can be used to assist the occupants during ingress and egress. Advantageously, the grab handle 90 can be used to overhang the upper edge 53 of the lower pad 20 to assist with concealing the upper edge 53 in addition to providing the lip portion 48 for releasably capturing the upper edge 53 while in the normally closed condition shown in FIG. 5.

While the present invention has been described as carried out in a specific embodiments thereof, it is not intended to be limited thereby but is intended to cover the invention broadly within the scope and spirit of the appended claims.

What is claimed is:

1. An air bag restraint system for use in a vehicle, the air bag restraint system comprising:

an instrument panel having an upper pad having a rearward edge, the instrument panel having a lower pad having an upper edge, the upper edge of the lower pad being releasably connected to the rearward edge of the upper pad; and an air bag module mounted forward of the lower pad and including an air bag deployable in a generally rearward direction;

whereby upon air bag deployment, the force of the deploying air bag releases the upper edge of the lower pad from the rearward edge of the upper pad such that the lower pad bends generally rearwardly and downwardly for permitting deployment of the air bag rearward of the lower pad.

2. The air bag restraint system of claim 1 wherein the rearward edge of the upper pad protrudes rearward past the upper edge of the lower pad such that the rearward edge of the upper pad shingles over and conceals the upper edge of the lower pad prior to air bag deployment.

3. The air bag restraint system of claim 1 wherein the rearward edge of the upper pad protrudes rearward and downward past the upper edge of the lower pad such that the rearward edge of the upper pad shingles over, releasably captures, and conceals the upper edge of the lower pad prior to air bag deployment.

4. The air bag restraint system of claim 1 wherein the rearward edge of the upper pad includes a rearwardly protruding grab handle located thereon which projects rearwardly past the upper edge of the lower pad for shingling over and concealing the upper edge.

5. The air bag restraint system of claim 1 wherein the rearward edge of the upper pad includes a rearwardly protruding grab handle located thereon which projects rearwardly and downwardly over the upper edge of the lower pad for shingling over, releasably capturing, and concealing the upper edge of the lower pad.

6. The air bag restraint system of claim 1 wherein the lower pad includes a generally transversely extending hinge portion spaced below the upper edge of the lower pad and whereby upon air bag deployment the lower pad pivots rearward and downward about the hinge portion to provide an air bag deployment opening through which the air bag deploys.

7. The air bag restraint system of claim 6 wherein the hinge portion is anchored to the vehicle for remaining generally stationary during air bag deployment.

8. The air bag restraint system of claim 6 wherein the hinge portion is anchored to the vehicle and wherein the lower pad includes a bottom edge and an upper portion positioned between the hinge portion and the upper edge and wherein the lower pad includes a lower portion positioned between the hinge portion and the bottom edge and wherein the upper portion of the lower pad pivots generally rearwardly and downwardly about the hinge portion to provide the air bag deployment opening while the lower portion remains generally stationary during air bag deployment.

9. The air bag restraint system of claim 6 wherein the lower pad includes a generally vertically oriented substrate portion and wherein the substrate portion includes a generally forwardly extending leg portion anchored to the vehicle and providing the hinge portion about which the lower pad bends open.

10. The air bag restraint system of claim 9 wherein the substrate is made of a molded plastic material and wherein the leg portion is integrally formed with the substrate portion of the lower pad of the instrument panel.

11. The air bag restraint system of claim 1 wherein the rearward edge of the upper pad extends rearwardly past the upper edge of the lower pad and wherein the rearward edge of the upper pad includes a downwardly extending lip portion which extends rearward and downward over the upper edge of the lower pad prior to air bag deployment for trapping the upper edge and releasably holding the lower pad in the generally vertical position prior to air bag deployment.

12. The air bag restraint system of claim 1 wherein the upper pad is generally horizontally oriented and wherein the lower pad is generally vertically oriented.

\* \* \* \* \*